(12) United States Patent
Lowry

(10) Patent No.: US 6,618,528 B2
(45) Date of Patent: Sep. 9, 2003

(54) OPTICAL DISPLAY APPARATUS

(75) Inventor: Brian C. Lowry, Emlenton, PA (US)

(73) Assignee: Transvision, Inc., Pittsburgh, PA (US)

( * ) Notice: Subject to any disclaimer, the term of this patent is extended or adjusted under 35 U.S.C. 154(b) by 0 days.

(21) Appl. No.: 09/766,563

(22) Filed: Jan. 19, 2001

(65) Prior Publication Data

US 2003/0002832 A1 Jan. 2, 2003

Related U.S. Application Data

(63) Continuation-in-part of application No. 09/569,811, filed on May 12, 2000, now Pat. No. 6,418,267, which is a continuation-in-part of application No. 09/482,290, filed on Jan. 13, 2000, now Pat. No. 6,304,703.

(51) Int. Cl.⁷ .............................. G02B 6/04; G09F 13/18
(52) U.S. Cl. ...................... 385/120; 385/115; 385/116; 385/121; 385/147; 385/901; 385/1; 40/546; 40/547; 345/32; 345/40; 345/55
(58) Field of Search ................................ 385/115, 116, 385/120, 121, 147, 901, 1, 42; 40/546, 547; 345/32, 40, 55; 359/10, 11, 451

(56) References Cited

U.S. PATENT DOCUMENTS

| | | | | |
|---|---|---|---|---|
| 3,295,910 A | * | 1/1967 | Hourdiaux | 359/451 |
| 3,644,922 A | * | 2/1972 | James et al. | 345/32 |
| 3,815,986 A | * | 6/1974 | Darbee | 355/1 |
| 3,853,658 A | * | 12/1974 | Ney | 156/180 |
| 4,116,739 A | * | 9/1978 | Glenn | 156/169 |
| 4,417,412 A | * | 11/1983 | Sansom | 40/547 |
| 4,650,280 A | * | 3/1987 | Sedlmayr | 385/120 |
| 4,738,510 A | * | 4/1988 | Sansom | 385/116 |
| 4,929,048 A | * | 5/1990 | Cuypers | 385/116 |
| 5,129,028 A | * | 7/1992 | Soltan | 385/120 |
| 5,293,437 A | * | 3/1994 | Nixon | 385/115 |
| 5,376,980 A | * | 12/1994 | Gersuk et al. | 353/94 |
| 5,381,502 A | * | 1/1995 | Veligdan | 385/115 |
| 5,400,178 A | * | 3/1995 | Yamada et al. | 359/449 |
| 5,642,449 A | * | 6/1997 | Phillips | 385/33 |
| 5,832,168 A | * | 11/1998 | Yenter | 385/147 |
| 5,911,024 A | * | 6/1999 | Wallace | 385/120 |
| 6,219,184 B1 | * | 4/2001 | Nagatani | 359/472 |
| 6,396,985 B2 | * | 5/2002 | Lowry et al. | 385/120 |

OTHER PUBLICATIONS

U.S. patent application Publication No. U.S. 2002/0097230A1 (Lowry et. al.), Published Jul. 25, 2002.*
U.S. patent application Publication Nio. U.S. 2002/0105480A1 (Lowry et. al.), Published Aug. 8, 2002.*
U.S. patent application Publication No. U.S. 2002/0097978 A1 (Lowry et. al.), Published Jul. 25, 2002.*
U.S. patent application Publication No. U.S. 2002/0097967 A1 (Lowry), Published Jul. 25, 2002.*

* cited by examiner

Primary Examiner—Brian Healy
(74) Attorney, Agent, or Firm—James M. Singer; Pepper Hamilton LLP

(57) ABSTRACT

A multiple optical fiber display module may be used in a Large Screen Display system. The multiple optical fiber display module includes at least two modular optical fiber display elements. Each modular display element further includes an optical fiber display tile, an optical fiber array, and an input matrix. The modular display module also includes a mounting frame for demountably attaching the input matrix of each modular optical fiber display tile to a single micro-display.

6 Claims, 2 Drawing Sheets

OPTICAL DISPLAY APPARATUS

CLAIM OF PRIORITY AND RELATED APPLICATIONS

This application claims priority to, and is a continuation-in-part of, U.S. Utility patent application Ser. No. 09/569,811, entitled "Micro-Display Driven Tiled Electro-Optic Display Apparatus," filed May 12, 2000, now U.S. Pat. No. 6,418,267, which is incorporated herein by reference in its entirety, and which is a continuation-in-part of U.S. Utility patent application Ser. No. 09/482,290, entitled "Tiled Fiber Optic Display Apparatus," filed Jan. 3, 2000, now U.S. Pat. No. 6,304,703, which is also incorporated herein by reference in its entirety.

This application relates to the provisional application of Brian C. Lowry and Jerald F. Lowry, entitled "Contoured Screen Display," filed on the even date herewith, which is incorporated herein by reference in its entirety.

BACKGROUND OF THE INVENTION

Large screen display ("LSD") technology enables the dynamic display of interactive and non-interactive content to large audiences. Applications of LSD technology are diverse and include public venues such as sports stadia, airports, and shopping malls. The wide range of applications drives a large and diverse market.

With the development and deployment of LSD technology comes the opportunity for further refinement and improvement of the apparatus and business methods that support the technology. Significant enhancements made to state-of-the-art LSD apparatus and business methods will likely generate a substantial increase in market share.

In an electro-optical LSD system having multiple modular optical fiber display tiles connected to a single micro-display, maintenance of the system becomes an issue. In particular, if one of the modular optical fiber display tiles becomes damaged, all modular optical fiber display tiles connected to the same micro-display must be replaced. Thus, there is a need for a way to connect multiple modular optical fiber display tiles to a single micro-display such that the modular optical fiber display tiles are individually replaceable.

The reliability of an electro-optical LSD system having a particular number of micro-display driven modular optical fiber display tiles is a function of the total number of micro-displays used. As the total number of micro-displays increases, system reliability decreases. For a given number of modular optical fiber display tiles, using a single micro-display to drive multiple modular optical fiber display tiles would therefore increase system reliability. Thus, there is also a need for a way to increase the reliability of an electro-optical LSD system having micro-display driven modular optical fiber display tiles.

Electro-optical LSD systems having micro-display driven modular optical fiber display tiles may suffer from non-uniform color balance across the LSD surface. This results from non-uniform color balance between modular optical fiber display tiles, which is in turn a result of non-uniform color temperatures among the light sources, which provide illumination to the micro-displays, which drive the modular optical fiber display tiles. Thus, there is a need for a way to assure uniform color balance across substantially all or all modular optical fiber display tiles in an electro-optical LSD system.

The current technology also does not provide a means for contouring an LSD surface comprised of multiple modular display tiles driven from a single micro-display. Thus, there is also a need for a way to provide a means for contouring an LSD surface comprised of multiple modular display tiles driven from a single micro-display.

SUMMARY OF THE INVENTION

In accordance with a preferred embodiment of the present invention, the invention features a multiple optical fiber display tile module for use in an LSD system. The multiple optical fiber display tile module includes at least two modular optical fiber display tiles. Each modular display tile further includes an optical fiber display tile, an optical fiber array, and an input matrix. The modular display tile also includes a mounting frame for demountably attaching the input matrix of each modular optical fiber display tile to a single micro-display.

In accordance with another embodiment, the invention features a micro-lens array interposed between the micro-display and each input matrix.

In accordance with another embodiment, the invention features an illumination source attached to and illuminating the micro-display.

DETAILED DESCRIPTION OF PREFERRED EMBODIMENTS OF THE INVENTION

This invention relates to an apparatus having a single micro-display or Spatial Light Modulator ("SLM") interconnected to multiple modular optical fiber display tiles for use in an Large Screen Display ("LSD") system.

Figure 1:
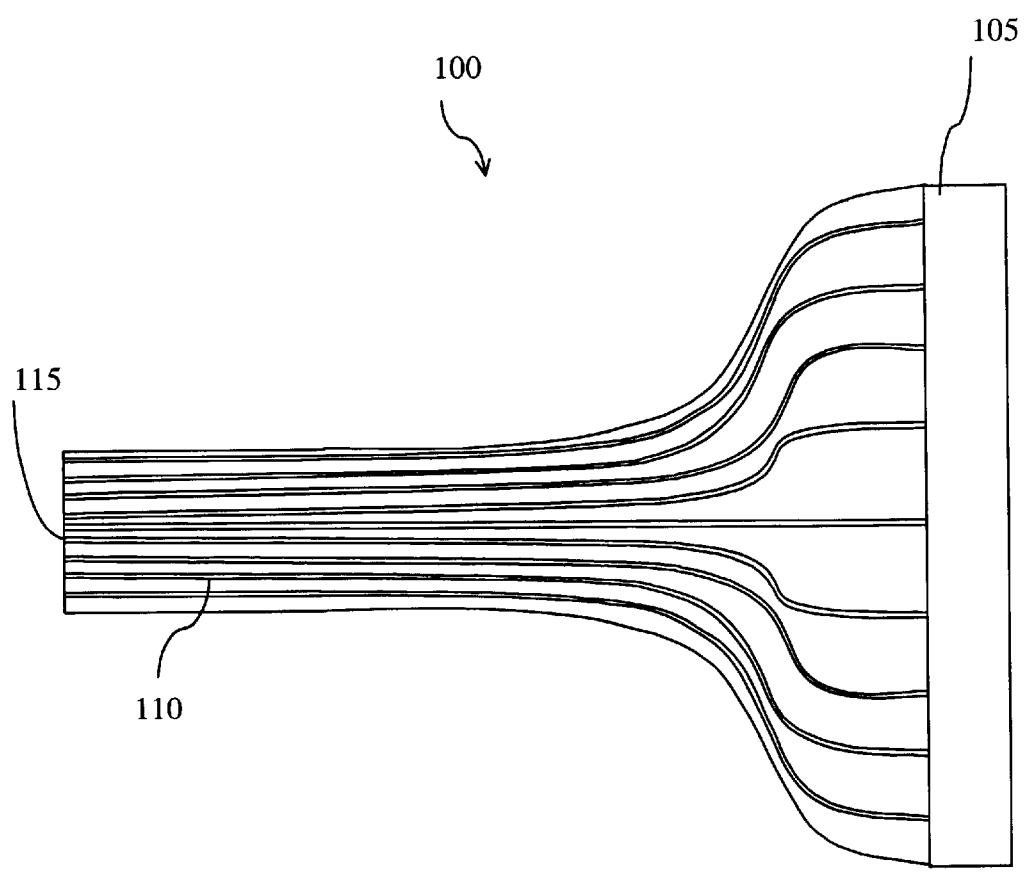
FIG. 1 is a schematic representation of a single modular optical fiber display tile.

Referring to FIG. 1, a modular optical fiber display element 100 includes an optical fiber display tile 105, mechanically and optically connected to an optical fiber array 110 and an input matrix 115 comprising the ends of the fibers in the array 110. A method for manufacturing and using modular optical fiber display elements 100 is fully shown and described in pending U.S. Utility patent applications Ser. No. 09/569,811 entitled "Micro-Display Driven Tiled Electro-Optic Display Apparatus" now U.S. Pat. No. 6,418,267, and Ser. No. 09/718,745 entitled "A Large Screen Fiber Optic Display With High Fiber Density and Method for its Rapid Assembly," both of which are commonly owned and assigned, and are herein incorporated by reference in their entirety.

Figure 2:
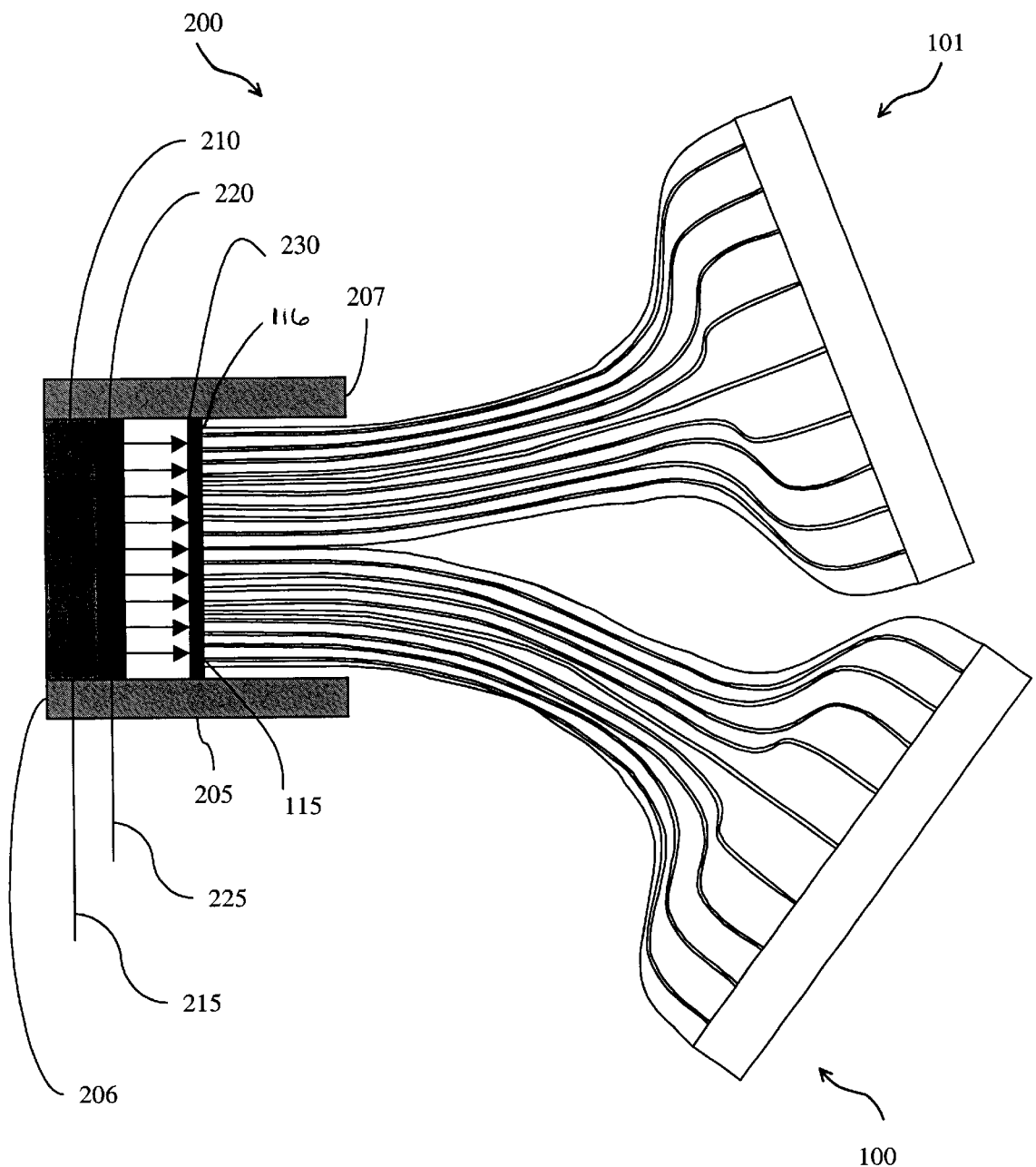
FIG. 2 is a schematic representation of multiple modular optical fiber display tiles driven from a single micro-display.

Referring to FIG. 2, multiple optical fiber display tile module 200 includes multiple optical fiber display tiles such as 100 and 101, a mounting frame 205, an illumination source 210 such as a halogen lamp, a micro-display 220, and a micro-lens array 230. Mounting frame 205 further includes a first end 206 and a second end 207. Illumination source 210 further includes an electrical power interconnect 215 for connecting to an electrical power source (not shown). Micro-display 220 further includes a video signal interconnect 225 for connecting to a video signal source (not shown), for the purpose of relaying the video signal to micro-display 220.

Illumination source 210 is demountably attached to the inside surface of mounting frame 205 at first end 206. Micro-display 220 is positioned and attached within mounting frame 205 relative to illumination source 210 such that illumination source 210 directs light through micro-display 220 toward micro-lens array 230. Micro-lens array 230 is positioned and attached within mounting frame 205 relative to micro-display 220 such that light directed toward it by micro-display 220 is focused toward and into input matrix 115. Preferably, the micro-lens array includes a number of lenses equal to the number of fibers. Each lens directs light to a corresponding fiber. Micro-lens array 230 is optional, however, and in an embodiment without a micro-lens array the light may be projected directly from the micro-display 220 to the input matrix 115. Each input matrix 115, shown in FIG. 1, of each modular optical fiber display tile 100 inserts into second end 207 of mounting frame 205. Optionally, mechanical contact of the matrix 115 may be made with micro-lens array 230. Mounting frame 205 is designed to align each input matrix such as 115 and 116 with micro-lens array 230 via a sliding connection. The size of micro-display 220 dictates the size of each input matrix such as 115 and 116. For example, if micro-display 220 measures approximately 1 inch by 1 inch, then multiple optical fiber display tile module 200 may include four optical fiber display tile modules 100 or 101 each having an input matrix 115 or 116 measuring approximately 0.50 inch by 0.50 inch. The above measurements are only intended to be exemplary. Preferably, for example, the micro-display has a size ranging from a 0.15 inch diagonal measurement to an 8-inch diagonal measurement.

The advantages of this invention include one or more of the following. One advantage is that it enables the construction of a contoured electro-optical LSD display surface comprised of multiple optical display tile modules, each module driven from a single micro-display. A second advantage is that it allows the connection of multiple modular optical fiber display tiles to a single micro-display such that the individual optical fiber display tiles are individually replaceable. A third advantage is that it reduces the cost of replacing a damaged modular optical fiber display tile. A fourth advantage is that it increases the reliability of an LSD system comprised of multiple optical fiber display tile modules, each module driven by a single micro-display. A fifth advantage is that it assures more uniform color balance across the entire display of electro-optical LSD systems.

It is to be understood that the invention is not limited in its application to the details of construction and to the arrangements of the components set forth herein or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A display tile module for a large screen display, comprising:
  (a) a plurality of optical fiber display tiles;
  (b) a plurality of optical fiber arrays, each array comprising a plurality of optical fibers, the arrays positioned so that each array is physically and optically connected to one of the display tiles;
  (c) a mounting frame having a first end and a second end, the first end and second end positioned substantially parallel to each other;
  (d) an illumination source positioned between the first end and the second end of the mounting frame, the illumination source having a front and a rear, the illumination source being operable to project light from the front;
  (e) a micro-display positioned within the mounting frame to receive the light projected from the illumination source and pass the light away from the illumination source;
  (f) a video signal interconnect that is operative to communicate a video signal to the micro-display;
  (g) a plurality of input matrices positioned within the mounting frame to receive the light passed through the micro-display and transmit the light through the optical fiber arrays to the display tiles.

2. The module of claim 1 wherein each optical fiber has a first end and a second end, the number of input matrices equals the number of optical fiber arrays, and each input matrix comprises the first ends of the optical fibers in the optical fiber array that corresponds to the input matrix.

3. The module of claim 1 further comprising a micro-lens array positioned within the mounting frame to receive the light passed by the micro-display and project the light toward the plurality of input matrices.

4. The module of claim 3 wherein the micro-lens array comprises a plurality of lenses, and the number of lenses equals the total number of optical fibers in all of the optical fiber arrays, and each lens is operative to direct light to a unique corresponding fiber.

5. The module of claim 3 wherein the micro-lens array and the plurality of input matrices are in physical contact.

6. The module of claim 1 wherein the micro-display has a size ranging from a 0.15-inch diagonal measurement to an 8-inch diagonal measurement.

* * * * *